United States Patent
Park et al.

(10) Patent No.: US 9,400,408 B2
(45) Date of Patent: Jul. 26, 2016

(54) LIQUID CRYSTAL DISPLAY

(71) Applicant: Samsung Display Co., Ltd., Yongin, Gyeonggi-Do (KR)

(72) Inventors: Kee-Bum Park, Cheonan-si (KR); Kyung Ho Kim, Seongnam-si (KR); Ho Kyung Kim, Gwangju (KR); Yoo Mi Ra, Ansan-si (KR); Dong Hee Shin, Cheonan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 195 days.

(21) Appl. No.: 14/151,103

(22) Filed: Jan. 9, 2014

(65) Prior Publication Data

US 2015/0042939 A1 Feb. 12, 2015

(30) Foreign Application Priority Data

Aug. 12, 2013 (KR) ........................ 10-2013-0095581

(51) Int. Cl.
*G02F 1/1343* (2006.01)
*G02F 1/1337* (2006.01)

(52) U.S. Cl.
CPC .... *G02F 1/134336* (2013.01); *G02F 1/133707* (2013.01); *G02F 2001/133761* (2013.01); *G02F 2001/134345* (2013.01)

(58) Field of Classification Search
None
See application file for complete search history.

(56) References Cited

U.S. PATENT DOCUMENTS

| 7,683,990 B2 | 3/2010 | Li et al. |
| 7,728,938 B2 | 6/2010 | Chang et al. |
| 2010/0207862 A1 | 8/2010 | Xu et al. |
| 2015/0009465 A1 | 1/2015 | Park et al. |

FOREIGN PATENT DOCUMENTS

| EP | 2320269 A1 | 5/2011 |
| KR | 1020120031801 A | 4/2012 |
| KR | 1020120129224 A | 11/2012 |
| KR | 1020150005000 | 1/2015 |

*Primary Examiner* — Richard Kim
(74) *Attorney, Agent, or Firm* — Cantor Colburn LLP

(57) ABSTRACT

A liquid crystal display includes: a thin film transistor array panel; a counter panel opposite to the thin film transistor array panel; a liquid crystal layer between the thin film transistor array panel and the counter panel; and pixel electrodes in the thin film transistor array panel, where each of the pixel electrodes includes a first sub-pixel electrode and a second sub-pixel electrode, where each of the first and second sub-pixel electrodes is divided into sub-regions by domain dividers, which controls pretilt angles of liquid crystal molecules of the liquid crystal layer, vertically adjacent pixel electrodes includes an upper pixel electrode and a lower pixel electrode, and the pretilt angles of the liquid crystal molecules in two bottom sub-regions of the second sub-pixel electrode of the upper pixel electrode and in two top sub-regions of the first sub-pixel electrode of the lower pixel electrode are opposite to each other.

14 Claims, 14 Drawing Sheets

LIQUID CRYSTAL DISPLAY

This application claims priority to Korean Patent Application No. 10-2013-0095581, filed on Aug. 12, 2013, and all the benefits accruing therefrom under 35 U.S.C. §119, the contents of which are incorporated by reference herein in its entirety.

BACKGROUND (a) Field

Exemplary embodiments of the invention relate to a liquid crystal display.

(b) Description of the Related Art

A liquid crystal display, which is one of the most widely used types of flat panel display, typically includes two panels, e.g., upper and lower panels, in which field generating electrodes, such as a pixel electrode and a common electrode, are disposed, and a liquid crystal layer interposed between the two panels. The liquid crystal display generates an electric field in the liquid crystal layer by applying a voltage to a field generating electrode and displays an image by determining an alignment of liquid crystal molecules of the liquid crystal layer and controlling polarization of incident light based on the generated electric field.

The liquid crystal display may be in various modes, and a liquid crystal display in a vertically aligned mode, in which longitudinal axes of the liquid crystal molecules are aligned substantially vertical to the upper and lower panels in the state in which an electric field is not applied, typically has a large contrast ratio and a wide reference viewing angle, and therefore has received attention.

In the liquid crystal display in the vertically aligned mode, a plurality of domains having different alignments directions of the liquid crystal may be provided in each pixel to implement the wide viewing angle.

In the liquid crystal display in the vertically aligned mode, a method of forming a pattern in a field generating electrode, and the like may be used to provide the plurality of domains. According to such a method, the plurality of domains may be formed on the liquid crystal layer by controlling an alignment direction of a liquid crystal by a fringe field, which is generated between an edge of a pattern of the field generating electrode and the field generating electrode facing the edge.

SUMMARY

Exemplary embodiments of the invention provide a liquid crystal display with improved display quality.

Exemplary embodiments of the invention provide a liquid crystal display, in which the occurrence of a dark part having a dot form, which may be visualized from a side, is substantially reduced or effectively prevented.

An exemplary embodiment of the invention provides a liquid crystal display including: a thin film transistor array panel; a counter panel opposite to the thin film transistor array panel; a liquid crystal layer between the thin film transistor array panel and the counter panel; and a plurality of pixel electrodes disposed in the thin film transistor array panel, where each of the pixel electrodes includes a first sub-pixel electrode and a second sub-pixel electrode, where each of the first and second sub-pixel electrodes is divided into a plurality of sub-regions by a plurality of domain dividers, which controls pretilt angles of liquid crystal molecules of the liquid crystal layer, vertically adjacent pixel electrodes includes an upper pixel electrode and a lower pixel electrode, and the pretilt angles of the liquid crystal molecules in two bottom sub-regions of the second sub-pixel electrode of the upper pixel electrode and the pretilt angles of the liquid crystal molecules in two top sub-regions of the first sub-pixel electrode of the lower pixel electrode are opposite to each other.

In an exemplary embodiment, the first sub-pixel electrode may be sequentially divided into first to fourth sub-regions from top to bottom, and the second sub-pixel electrode is sequentially divided into first to sixth sub-regions from top to bottom.

In an exemplary embodiment, a sum of sizes of first, second, fifth, and sixth sub-regions of the second sub-pixel electrode may be substantially the same as a sum of sizes of third and fourth sub-regions of the second sub-pixel electrode.

In an exemplary embodiment, the pretilt angles of the liquid crystal molecules in the first and second sub-regions of the first sub-pixel electrode, the pretilt angles of the liquid crystal molecules in the first and second sub-regions of the second sub-pixel electrode, and the pretilt angles of the liquid crystal molecules in the fifth and sixth sub-regions of the second sub-pixel electrode may be substantially the same as each other, and the pretilt angles of the liquid crystal molecules in the third and fourth sub-regions of the first sub-pixel electrode and the pretilt angles of the liquid crystal molecules in the third and fourth sub-regions of the second sub-pixel electrode may be substantially the same as each other.

In an exemplary embodiment, the pretilt angles of the liquid crystal molecules in the first and second sub-regions of the first sub-pixel electrode and the pretilt angles of the liquid crystal molecules in the third and fourth sub-regions of the first sub-pixel electrode may be opposite to each other.

In an exemplary embodiment, the pretilt angles of the liquid crystal molecules in two sub-regions of the first sub-pixel electrode of a pixel electrode and the pretilt angles of the liquid crystal molecules in two bottom sub-regions of the second sub-pixel electrode of the pixel electrode may be substantially the same as each other.

In an exemplary embodiment, horizontally adjacent pixel electrodes of the pixel electrodes may include a left pixel electrode and a right pixel electrode, and a pretilt angle of the liquid crystal molecules in each sub-region of a left pixel electrode and a pretilt angle of the liquid crystal molecules in each corresponding sub-region of a right pixel electrode may be substantially symmetrical to each other with respect to a boundary between the left and right pixel electrodes.

In an exemplary embodiment, the upper pixel electrode may be the left pixel electrode, and a pretilt angle of the liquid crystal molecules in each sub-region of the lower pixel electrode may be substantially the same as a pretilt angle of the liquid crystal molecules in each corresponding sub-region of the right pixel electrode.

In an exemplary embodiment, each of the first sub-pixel electrode and the second sub-pixel electrode may include a plurality of unit electrodes which are connected to each other, and each of the unit electrodes may define two adjacent sub-regions.

In an exemplary embodiment, the first sub-pixel electrode may include an upper unit electrode and a lower unit electrode, and the second sub-pixel electrode may include an upper unit electrode, an intermediate unit electrode, and a lower unit electrode.

In an exemplary embodiment, a size of the intermediate unit electrode of the second sub-pixel electrode may be substantially the same as a sum of a size of the upper unit electrode of the second sub-pixel electrode and a size of the lower unit electrode of the second sub-pixel electrode.

In an exemplary embodiment, each of the unit electrodes may include a horizontal stem and a vertical stem, and the horizontal stem may define a boundary between the two adjacent sub-regions.

In an exemplary embodiment, each of the unit electrodes may further include a plurality of fine branches which obliquely extend from the horizontal stem or the vertical stem, and the fine branches may be disposed in the two adjacent sub-regions.

In an exemplary embodiment, the fine branches in the two adjacent sub-regions may extend substantially symmetric with respect to the horizontal stem, and the fine branches in two adjacent sub-regions between adjacent unit electrodes may extend substantially in opposing directions to each other.

According to exemplary embodiments of the invention the side visibility of the liquid crystal display is substantially improved and the phenomenon, in which the dark part is visualized at the boundary portion of the upper and lower pixels when viewed from a side viewing angle, is effectively prevented or substantially reduced.

BRIEF DESCRIPTION OF THE DRAWINGS

The above and other features of the invention will become more apparent by describing in detail exemplary embodiments thereof with reference to the accompanying drawings, in which.

DETAILED DESCRIPTION

Figure 1:
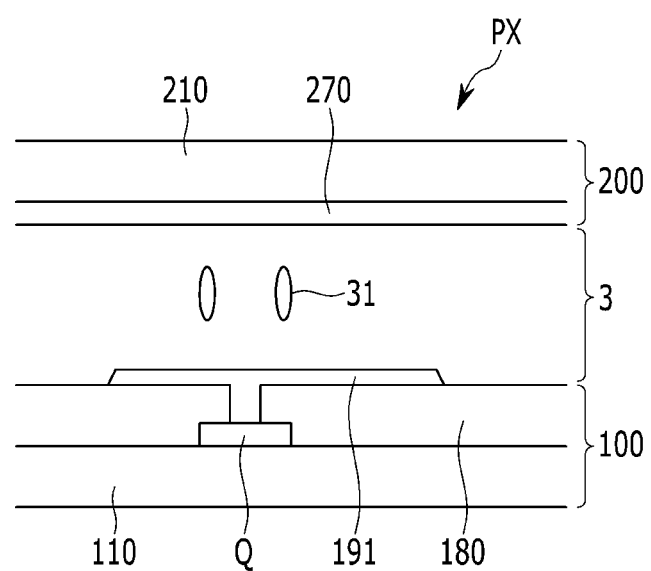
FIG. 1 is a cross-sectional view of an exemplary embodiment of a liquid crystal display, according to the invention.

The invention now will be described more fully hereinafter with reference to the accompanying drawings, in which various embodiments are shown. The invention may, however, be embodied in various different forms, and should not be construed as being limited to the embodiments set forth herein. Rather, these embodiments are provided so that this disclosure will be thorough and complete, and will fully convey the scope of the invention to those skilled in the art. Like reference numerals refer to like elements throughout.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings herein.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiment of a liquid crystal display according to the invention will be described in detail with reference to the accompanying drawings.

FIG. 1 is a cross-sectional view of an exemplary embodiment of a liquid crystal display, according to the invention.

Referring to FIG. 1, an exemplary embodiment of a liquid crystal display includes a plurality of pixels PXs, in which each pixel PX includes two panels, e.g., a lower panel 100 and an upper panel 200, which face each other, and a liquid crystal layer 3 interposed between the two panels 100 and 200.

First, in the upper panel 200 of each pixel, an upper electrode 270 is disposed on an upper insulating substrate 210. The upper electrode 270 may include a transparent conductive material, such as indium tin oxide ("ITO") and indium zinc oxide ("IZO"), for example. The upper electrode 270 may be applied with a common voltage.

In an exemplary embodiment, the upper electrode 270 may be integrally connected over the upper panel 200 and an opening (not illustrated) may be defined in the upper electrode 270. In such an embodiment, the opening of the upper electrode for each pixel may have substantially a same shape as each other.

The upper panel 200 may further include a color filter (not illustrated) and a light blocking member (not illustrated), which are disposed under the upper electrode 270. The light blocking member, which is also referred to as a black matrix, may effectively prevent a light leakage between the pixels. A color filter may display one of the primary colors, such as three primary colors of red, green and blue. In an alternative exemplary embodiment, at least one of the light blocking member and the color filter may be disposed in the lower panel 100. In an exemplary embodiment, where the upper panel 200 includes the color filter or the light blocking member, an overcoat (not illustrated) may be disposed between the color filter or the light blocking member and the upper electrode 270.

Next, in the lower panel 100, a plurality of signal lines (not illustrated) and switching elements Q connected to the signal lines are disposed on a lower insulating substrate 110.

The signal lines may include a plurality of gate lines (not illustrated) and a plurality of data lines (not illustrated). The gate lines transfer gate signals and may extend substantially in a horizontal direction. The data lines may intersect the gate lines, insulated from the gate lines and transfer a data voltage.

The switching element Q may include a thin film transistor. The thin film transistor, which is a three terminal element, may include a gate electrode connected to a corresponding gate line of the gate lines, a source electrode connected to a corresponding data line of the data lines, and a drain electrode facing the source electrode. The thin film transistor may further include a semiconductor (not illustrated) which may include hydrogenation amorphous, polysilicon, oxide semiconductor, or the like, for example. In an exemplary embodiment, where the thin film transistor is disposed in the lower panel 100, the lower panel may be referred to as a thin film transistor array panel.

A passivation layer 180 including an organic insulating material or an inorganic insulating material is disposed on the switching element Q. In such an embodiment, a contact hole (not illustrated), which exposes the drain electrode of the switching element Q, may be defined in the passivation layer 180.

A pixel electrode 191 may be disposed on the passivation layer 180. The pixel electrode 191 may include a transparent conductive material, such as ITO and IZO, for example, or a reflective metal, such as aluminum, silver, chromium, or an alloy thereof, for example. The pixel electrode 191 is connected to the drain electrode of the switching element Q through the contact hole in the passivation layer 180 to be applied with the data voltage.

Next, an exemplary embodiment of the liquid crystal display according to the invention will be described in detail with reference to FIGS. 2 to 7.

Figure 2:
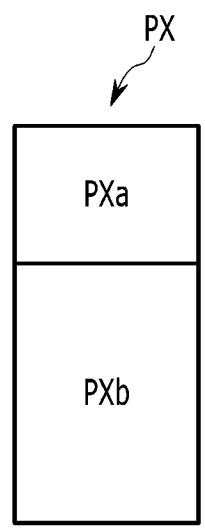
FIG. 2 is a diagram illustrating two sub-pixels in a pixel of an exemplary embodiment of the liquid crystal display, according to the invention.
Figure 3:
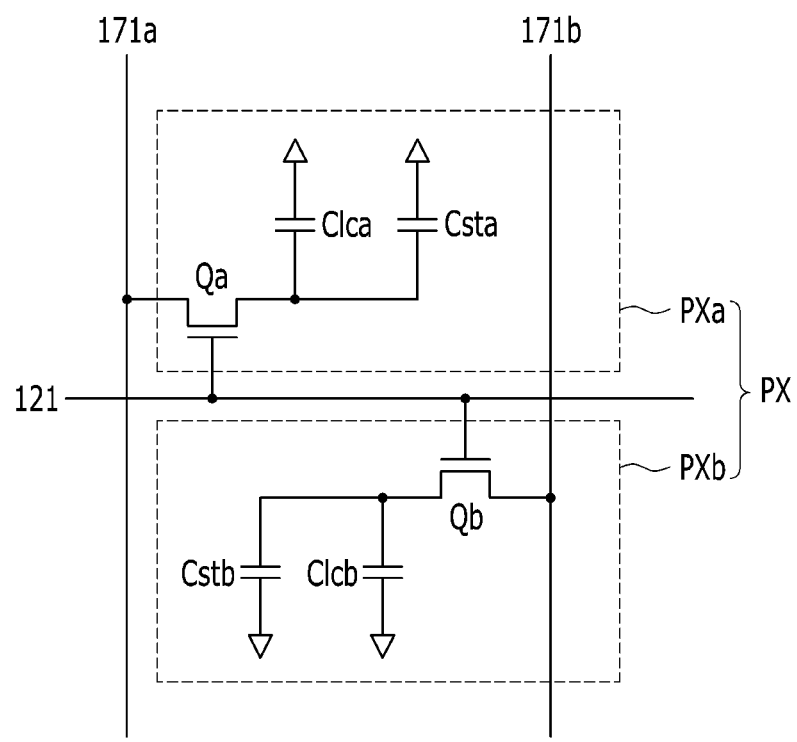
FIG. 3 is an equivalent circuit diagram of a pixel of an exemplary embodiment of the liquid crystal display, according to the invention.
Figure 4:
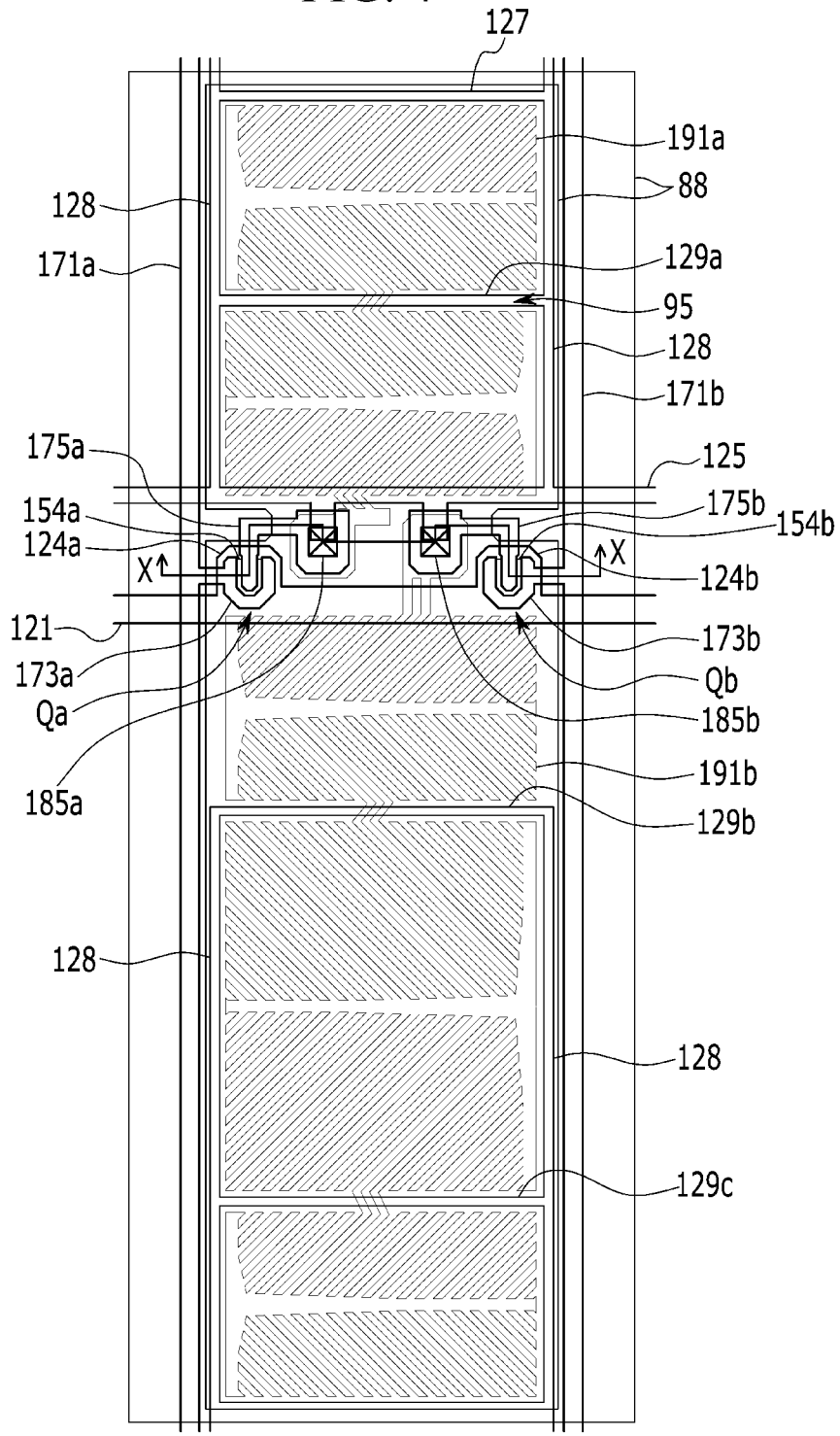
FIG. 4 is a top plan view of a pixel of an exemplary embodiment of the liquid crystal display, according to the invention.
Figure 5:
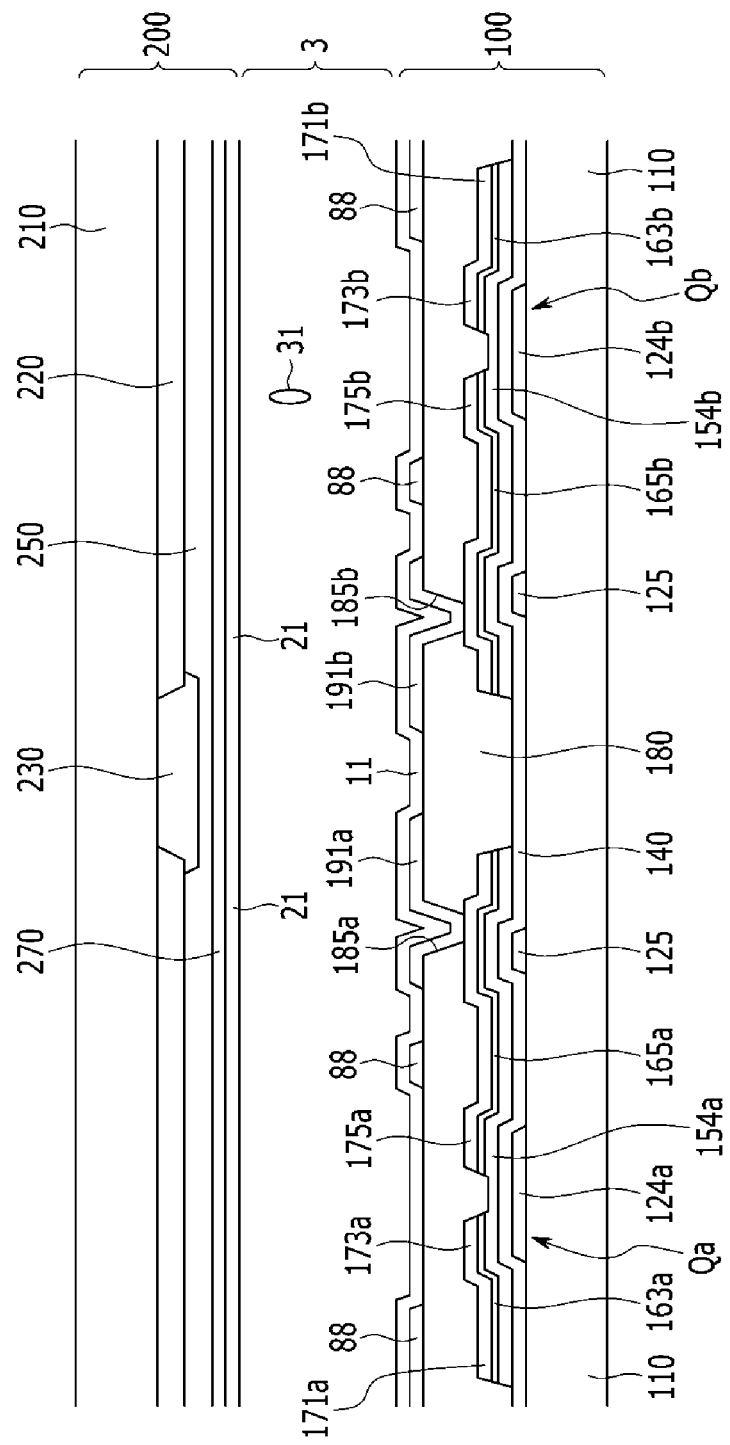
FIG. 5 is a cross-sectional view taken along line X-X of the liquid crystal display of FIG. 4.
Figure 6:
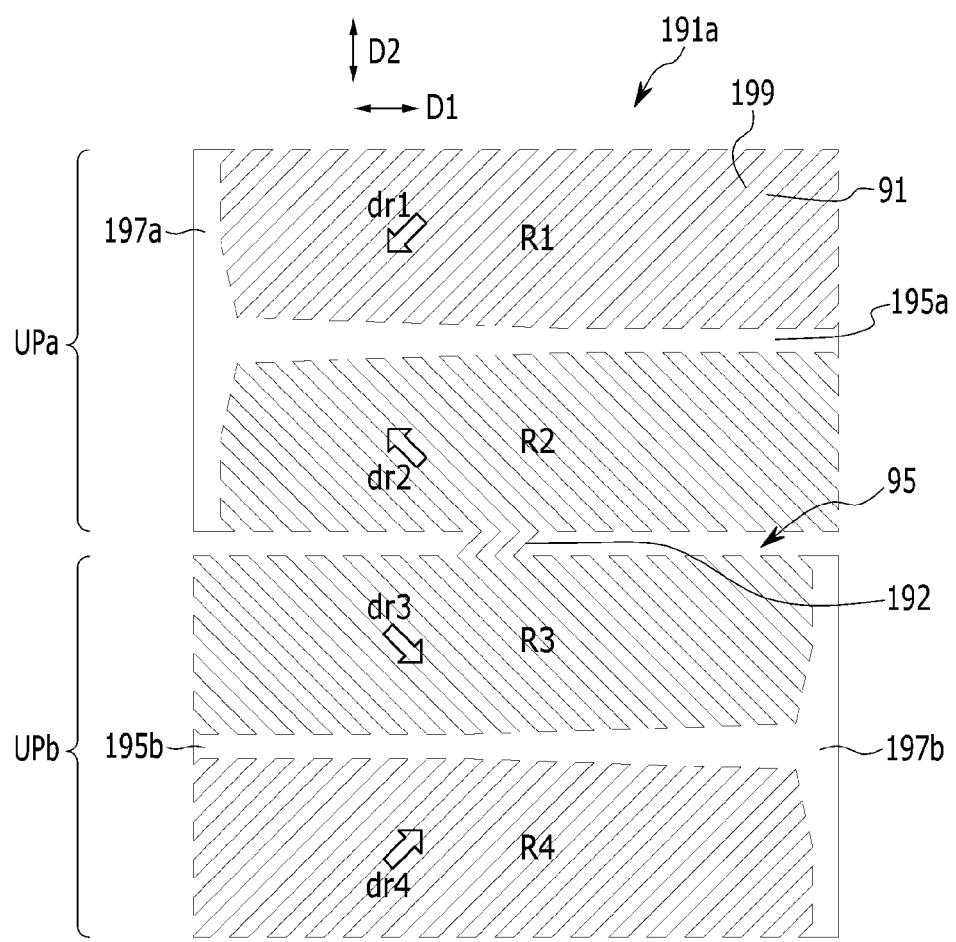
FIG. 6 is a plan view of a first sub-pixel electrode of an exemplary embodiment of the liquid crystal display according to the exemplary embodiment of the invention.
Figure 7:
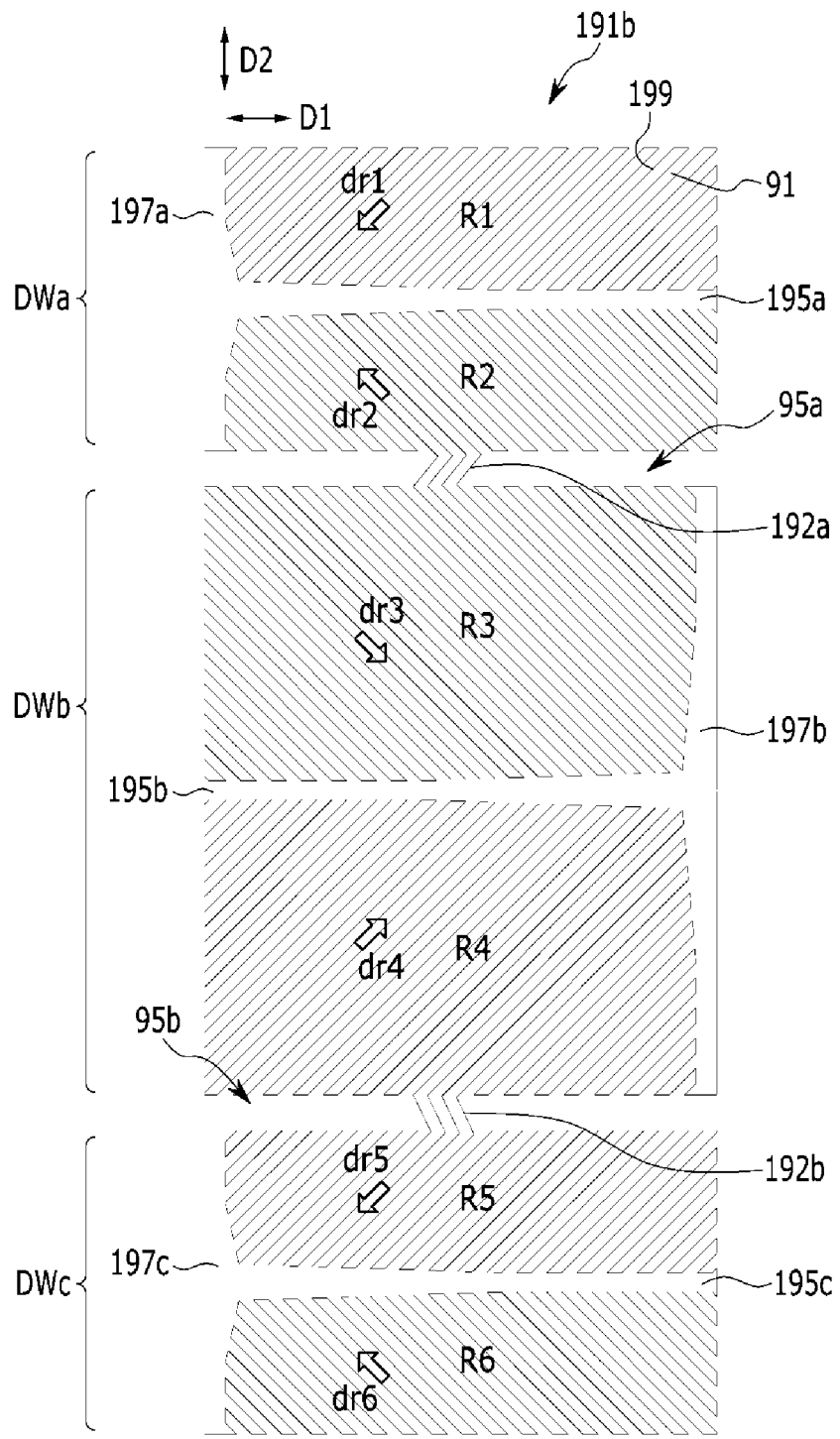
FIG. 7 is a plan view of a second sub-pixel electrode of an exemplary embodiment of the liquid crystal display according to the exemplary embodiment of the invention.

FIG. 2 is a diagram illustrating two sub-pixels included in a pixel of an exemplary embodiment of the liquid crystal display according to the invention, FIG. 3 is an equivalent circuit diagram of a pixel of an exemplary embodiment of the liquid crystal display according to the invention, FIG. 4 is a layout view of a pixel of an exemplary embodiment of the liquid crystal display according to the invention, FIG. 5 is a cross-sectional view taken along line X-X of the liquid crystal display of FIG. 4, FIG. 6 is a plan view of a first sub-pixel electrode of an exemplary embodiment of the liquid crystal display according to the invention, and FIG. 7 is a plan view of a second sub-pixel electrode of an exemplary embodiment of the liquid crystal display according to the invention.

Referring to FIG. 2, a pixel PX of an exemplary embodiment of a liquid crystal display may include a first sub-pixel PXa and a second sub-pixel PXb. The first sub-pixel PXa and the second sub-pixel PXb may display an image corresponding to a same input image signal based on different gamma curves from each other or display the image corresponding to the same input image signal based on a same gamma curve as each other. In an exemplary embodiment, the first sub-pixel PXa and the second sub-pixel PXb of a pixel PX may display images having different luminance to improve side visibility of an image corresponding to an input image signal. In an exemplary embodiment, areas of the first sub-pixel PXa and the second sub-pixel PXb may be substantially the same as or substantially equal to each other. In an alternative exemplary embodiment, the areas of the first sub-pixel PXa and the second sub-pixel PXb may be different from each other, e.g., the area of the first sub-pixel PXa may be greater than or less than the area of the second sub-pixel PXb.

In an exemplary embodiment, as described above, the pixel PX including the first sub-pixel PXa and the second sub-pixel PXb may have various circuit structures and dispositions to display the images having different luminance.

Referring to FIG. 3, an exemplary embodiment of the liquid crystal display includes a plurality of signal lines including a first data line 171a, a second data line 171b and a gate line 121, and a pixel PX connected to the signal lines.

In an exemplary embodiment, the first sub-pixel PXa of the pixel PX includes a first switching element Qa, a first liquid crystal capacitor Clca and a first storage capacitor Csta, and second sub-pixel PXb of the pixel PX includes a second switching element Qb, a second liquid crystal capacitor Clcb and a second storage capacitor Cstb. The first switching element Qa, which is a three terminal element, such as a thin film transistor, includes a control terminal connected to the gate line 121 and an input terminal connected to the first data line 171a. An output terminal of the first switching element Qa is connected to the first liquid crystal capacitor Clca and the first storage capacitor Csta. The second switching element Qb, which is a three terminal element, such as a thin film transistor, includes a control terminal connected to the gate line 121 and an input terminal connected to the second data line 171b. An output terminal of the second switching element Qb is connected to the second liquid crystal capacitor Clcb and the second storage capacitor Cstb.

The first liquid crystal capacitor Clca and the second liquid crystal capacitor Clcb may be applied with different data voltages from each other based on a same input image signal through the first and second switching elements Qa and Qb, which are connected to first and second data lines 171a and 171b. Therefore, the side visibility of the liquid crystal display may be substantially improved by different charging voltages of the first and second liquid crystal capacitors Clca and Clcb.

FIGS. 4 and 5 illustrate an exemplary of the liquid crystal display including the circuit structure illustrated in FIG. 3, according to the invention.

In an exemplary embodiment, the liquid crystal display includes two panels, e.g., the lower panel 100 and the upper panel 200 facing each other, and the liquid crystal layer 3 interposed between the two panels 100 and 200.

In the lower panel 100, the gate line 121, which includes a first gate electrode 124a and a second gate electrode 124b and extends substantially in the first direction, is disposed on the lower insulating substrate 110. A gate insulating layer 140 is disposed on the gate line 121, and first and second semiconductors 154a and 154b are disposed on the gate insulating layer 140. Ohmic contacts 163a, 163b, 165a and 165b are disposed on the first and second semiconductors 154a and 154b. Data conductors which include the first and second data lines 171a and 171b, first and second drain electrode 175a and 175b are disposed on the ohmic contacts 163a, 163b, 165a and 165b. The first and second data lines 171a and 171b extend substantially in a vertical direction. The first source electrode 173a and the first drain electrode 175a overlap the first semiconductor 154a, and the second source electrode 173b and the second drain electrode 175b overlap the second semiconductor 154b.

The first gate electrode 124a, the first source electrode 173a and the first drain electrode 175a collectively define the first thin film transistor Qa, along with the first semiconductor 154a, and the second gate electrode 124b, the second source electrode 173b and the second drain electrode 175b collectively define the second thin film transistor Qb, along with the second semiconductor 154b.

A passivation layer 180 is disposed on the data conductors including the first and second data lines 171b and 171b. Contact holes 185a and 185b, which expose the first and second drain electrodes 175a and 175b, respectively, may be defined through the passivation layer 180.

First and second sub-pixel electrodes 191a and 191b and a shielding electrode 88 may be disposed on the passivation layer 180 and an alignment layer 11 may be positioned thereon. The detailed structure of the first and second sub-pixel electrodes 191a and 191b will be described later with reference to FIGS. 6 and 7.

An opening which encloses the circumference of the first and second sub-pixel electrodes 191a and 191b of the pixel PX is defined in the shielding electrode 88 includes, and defines a pixel area. The shielding electrode 88 may include substantially the same material as the first and second sub-pixel electrodes 191a and 191b, may be disposed in a same layer as the first and second sub-pixel electrodes 191a and 191b, and may receive the common voltage. The shielding electrode 88 includes a portion which overlaps the first and second data lines 171a and 171b. The shielding electrode 88 shields an electric field by the adjacent pixel PX or an electric field by the first and second data lines 171a and 171b, such that the shielding electrode 88 effectively prevent a crosstalk and light leakage from or around the pixel PX.

In the upper panel 200, a color filter 230 and a light blocking member 220 may be disposed on the upper insulating substrate 210. In an alternative exemplary embodiment, at least one of the light blocking member 220 and the color filter 230 may be disposed in the lower panel 100.

An overcoat 250 is disposed on the color filter 230 and the light blocking member 220, and the upper electrode 270 is disposed on the overcoat 250. An alignment layer 21 may be disposed on the upper electrode 270.

The liquid crystal layer 3, which is disposed between the lower and upper panels 100 and 200, includes a liquid crystal molecule 31 having dielectric anisotropy. In one exemplary embodiment, for example, the liquid crystal molecule 31 may have a negative dielectric anisotropy. The liquid crystal molecule 31 may be aligned in a predetermined direction such that the longitudinal axis thereof may be disposed substantially vertical to the surfaces of the low and upper panels 100 and 200 in a state in which no the electric field is generated in the liquid crystal layer 3.

The first sub-pixel electrode 191a and the upper electrode 270 of the upper panel form the first liquid crystal capacitor Clca, along with the liquid crystal layer 3 therebetween, and the second sub-pixel electrode 191b and the upper electrode 270 form the second liquid crystal capacitor Clcb, along with the liquid crystal layer 3 therebetween to hold the voltage applied to the first and second thin film transistors Qa and Qb, even after the first and second thin film transistors Qa and Qb are turned off In an exemplary embodiment, the liquid crystal display may further include a storage electrode line 125 which overlaps the first and second sub-pixel electrodes 191a and 191b or the first and second drain electrodes 175a and 175b to form the first and second storage capacitors Csta and Cstb. The storage electrode line 125 transfers a voltage such as the common voltage. The storage electrode line 125 may be disposed on the same layer as the gate line 121, e.g., may be disposed between the lower insulating substrate 110 and the gate insulating layer 140.

The storage electrode line 125 may include horizontal parts 129a, 129b and 129c, which overlap a gap 95 defined in the first and second sub-pixel electrodes 191a and 191b. In an exemplary embodiment, the storage electrode line 125 may further include a pair of vertical parts 128, which extends in a direction substantially vertical to the gate line 121, and a horizontal part 127 which connects the pair of vertical parts 128, but the structure of the storage electrode line 125 is not limited thereto. The horizontal parts 129a, 129b and 129c of the storage electrode line 125 may be disposed between the pair of vertical parts 128, and connected to the pair of vertical parts 128.

FIG. 6 is a plan view of a first sub-pixel electrode of an exemplary embodiment of the liquid crystal display, according to the invention and FIG. 7 is a plan view of a second sub-pixel electrode of an exemplary embodiment of the liquid crystal display, according to the invention.

Referring to FIG. 6, an overall shape of the first sub-pixel electrode 191*a* is substantially a quadrangle, and includes an upper unit electrode UPa and a lower unit electrode UPb, which are adjacent to each other, and the gap 95 is defined between the upper and lower unit electrodes UPa and UPb. The upper unit electrode UPa and the lower unit electrode UPb may have substantially the same size (e.g., the same area) as each other. The upper unit electrode UPa and the lower unit electrode UPb are electrically connected to each other through a connection part 192. The connection part 192 may be disposed on the same layer as the first sub-pixel electrode 191*a*, and may include the same material as the first sub-pixel electrode 191*a*. In an exemplary embodiment, as shown in FIG. 6, the connection part 192 may be disposed at a center of the first sub-pixel electrode 191*a*. In an alternative exemplary embodiment, the connection part 192 may also be disposed at left and/or right edges of the first sub-pixel electrode 191*a*.

The upper unit electrode UPa includes a horizontal stem 195*a* and a vertical stem 197*a* which is connected to the horizontal stem. The vertical stem 197*a* extends substantially in a vertical direction D2 and defines an edge of the upper unit electrode UPa, for example, a left edge. The horizontal stem 195*a* may extend substantially in a horizontal direction D1, may be substantially vertical to the vertical stem 197*a*, may extend from substantially a center of the vertical stem 197*a*.

A shape of the lower unit electrode UPb and a shape of the upper unit electrode UPa may be substantially symmetric to each other with respect to the gap 95 therebetween, e.g., rotationally symmetric with respect to a center of the gap 95. In an exemplary embodiment, the lower unit electrode UPb includes a horizontal stem 195*b* and a vertical stem 197*b* which is connected to the horizontal stem 195*b*. The vertical stem 197*b* extends substantially in a vertical direction D2, and defines an edge of the lower unit electrode UPb, for example, a right edge. The horizontal stem 195*b* may extend substantially in the horizontal direction D1, may be substantially vertical to the vertical stem 197*b*, and may extend from substantially a center of the vertical stem 197*b*.

In an exemplary embodiment, the horizontal stems 195*a* and 195*b* may be longer than the vertical stems 197*a* and 197*b*.

Each of the horizontal stems 195*a* and 195*b* of the upper and lower unit electrodes UPa and UPb may include a portion at which the width thereof is changed, and the horizontal stems 195*a* and 195*b* may have the largest width at a position, at which the horizontal stems 195*a* and 195*b* are connected to the vertical stems 197*a* and 197*b*. A portion, at which the width of each of the horizontal stems 195*a* and 195*b* is changed, starts from a portion at which the horizontal stems 195*a* and 195*b* are connected to the vertical stems 197*a* and 197*b*, such that the horizontal stems 195*a* and 195*b* may have a width decreasing as being far away from the vertical stems 197*a* and 197*b*.

Each of the vertical stems 197*a* and 197*b* of the upper and lower unit electrodes UPa and UPb may include a portion, at which the width thereof is changed, and the horizontal stems 195*a* and 195*b* may have the largest width at a position which the horizontal stems 195*a* and 195*b* are connected to the vertical stems 197*a* and 197*b*. A portion at which the width of each of the vertical stems 197*a* and 197*b* is changed starts from a portion at which the vertical stems 197*a* and 197*b* are connected to the horizontal stems 195*a* and 195*b*, such that the vertical stems 197*a* and 197*b* may have a width decreasing as being far away from the horizontal stems 195*a* and 195*b*.

The first sub-pixel electrode 191*a* is divided into a plurality of sub-regions R1, R2, R3 and R4 by the horizontal stems 195*a* and 195*b*, the vertical stems 197*a* and 197*b*, and the gap 95. The horizontal stems 195*a* and 195*b*, the vertical stems 197*a* and 197*b*, and the gap 95 define boundaries between the sub-regions R1, R2, R3 and R4.

The first sub-pixel electrode 191*a* may further include a plurality of fine branches 199, which is disposed in each of the sub-regions R1, R2, R3 and R4. The fine branches 199 may obliquely extend outwardly from the horizontal stems 195*a* and 195*b* or the vertical stems 197*a* and 197*b*. The fine branches 199 of different sub-regions R1, R2, R3 and R4 of the first sub-pixel electrode 191*a* may extend in different directions from each other. In an exemplary embodiment, the fine branches 199 of adjacent sub-regions R1, R2, R3 and R4 may form an angel of about 90° or about 180°. The extending direction of the fine branches 199 in a same sub-region of the sub-regions R1, R2, R3, and R4 may be substantially the same as each other.

In an exemplary embodiment, the fine branches 199 of an upper sub-region R1 among the sub-regions R1 and R2 defined by the horizontal stem 195*a* and the vertical stem 197*a* of the upper unit electrode UPa may obliquely extend in an upper right direction from the horizontal stem 195*a* or the vertical stem 197*a*, and the fine branches 199 of a lower sub-region R2 among the sub-regions R1 and R2 defined by the horizontal stem 195*a* and the vertical stem 197*a* of the upper unit electrode UPa may obliquely extend in a lower right direction from the horizontal stem 195*a* or the vertical stem 197*a*. In such an embodiment, the fine branches 199 of an upper sub-region R3 among the sub-regions R3 and R4 defined by the horizontal stem 195*b* and the vertical stem 197*b* of the lower unit electrode UPb may obliquely extend in an upper left direction from the horizontal stem 195*b* or the vertical stem 197*b*, and the fine branches 199 of a lower sub-region R4 among the sub-regions R3 and R4 defined by the horizontal stem 195*b* and the vertical stem 197*b* of the lower unit electrode UPb may obliquely extend in a lower left direction from the horizontal stem 195*b* or the vertical stem 197*b*.

A fine slit 91 is defined between adjacent fine branches 199.

In an exemplary embodiment, widths of the fine slits 91 and the fine branches 199 may be in a range of about 5 micrometers ($\mu$m) to about 8 $\mu$m, but are not limited thereto. I an exemplary embodiment, a ratio of the widths of the fine branches 199 to the widths of the fine slits 91 may be about 1.5:1 to about 1:1.5, but is not limited thereto and may be variously modified display characteristics in an alternative exemplary embodiment.

An acute angle formed by the fine branches 199 and the horizontal stems 195*a* and 195*b* may be in a range of about 40° to about 45°, but is not limited thereto, and may be variously modified based on the display characteristics, such as the visibility of the liquid crystal display.

FIG. 7 illustrates the second sub-pixel electrode 191*b*. In an exemplary embodiment, the second sub-pixel electrode 191*b* is different from the first sub-pixel electrode 191*a* which includes the two unit electrodes UPa and UPb. In an exemplary embodiment, the second sub-pixel electrode 191*b* may include three unit electrodes DWa, DWb and DWc.

The second sub-pixel electrode 191b has a substantially quadrangular shape and includes an upper unit electrode DWa, an intermediate unit electrode DWb, and a lower unit electrode DWc, which are adjacent to each other, and gaps 95a and 95b are defined therebetween. The upper unit electrode DWa and the intermediate unit electrode DWb are electrically connected to each other through a connection part 192a, and the intermediate unit electrode DWb and the lower unit electrode DWc are electrically connected to each other through a connection part 192b. The connection parts 192a and 192b may be disposed on the same layer as the second sub-pixel electrode 191b and may include substantially the same material as the second sub-pixel electrode 191b.

A shape of each of the upper unit electrode DWa and the lower unit electrode DWc may be substantially the same as the shape of the upper unit electrode UPa of the first sub-pixel electrode 191a. In such an embodiment, the sizes of each the upper unit electrode DWa and the lower unit electrode DWc and the size of the upper unit electrode UPa of the first sub-pixel electrode 191a may be different from each other. In such an embodiment, each of the upper and lower unit electrodes DWa and DWc include a horizontal stem 195a or 195c and a vertical stem 197a or 197c connected thereto. The vertical stems 197a and 197c of the upper unit electrode DWa and the lower unit electrode DWc extend substantially in a vertical direction D2 and define edges of the upper and lower unit electrodes DWa and DWc, for example, left edges. The horizontal stems 195a and 195c of the upper unit electrode DWa and the lower unit electrode DWc may extend substantially in the horizontal direction D1, which is substantially vertical to the vertical stems 197a and 197c, and may extend from substantially the centers of the vertical stems 197a and 197c, respectively.

The sizes of the upper unit electrode DWa and the lower unit electrode DWc may be substantially the same as each other or may be different from each other.

The intermediate unit electrode DWb has a shape substantially symmetric to the shapes of the upper and lower unit electrodes DWa and DWc. The intermediate unit electrode DWb may include a horizontal stem 195b and a vertical stem 197b which is connected to the horizontal stem 195b. The vertical stem 197b extends substantially in the vertical direction D2, and defines an edge of the intermediate unit electrode DWb, for example, a right edge. The horizontal stem 195b of the intermediate unit electrode DWb may extend substantially in the horizontal direction D1, may be substantially vertical to the vertical stem 197b, and may extend from substantially a center of the vertical stem 197b. In an exemplary embodiment, the intermediate unit electrode DWb In an exemplary embodiment, the size of the intermediate unit electrode DWb may be substantially the same as a sum of the size of the upper unit electrode DWa and the size of the lower unit electrode DWc such that a domain asymmetry in a left and right side viewing angle is substantially improved.

The second sub-pixel electrode 191b is divided into a plurality of sub-regions R1, R2, R3, R4, R5 and R6 by the horizontal stems 195a, 195b and 195c, the vertical stems 197a, 197b and 197c, and the gaps 95a and 95b. The horizontal stems 195a, 195b and 195c, the vertical stems 197a, 197b and 197c, and the gaps 95a and 95b define boundaries between the sub-regions R1, R2, R3, R4, R5 and R6.

The second sub-pixel electrode 191b may further include a plurality of fine branches 199 disposed in each of the sub-regions R1, R2, R3, R4, R5 and R6 thereof. The fine branches 199 may obliquely extend outwardly from the horizontal stems 195a, 195b and 195c, or the vertical stems 197a, 197b and 197c. The fine branches 199 of different sub-regions R1, R2, R3, R4, R5 and R6 of the second one sub-pixel electrode 191b may extend in different directions from each other. In an exemplary embodiment, the fine branches 199 of the adjacent sub-regions R1, R2, R3, R4, R5 and R6 may form an angle of about 90° or about 180°. The extending direction of the fine branches 199 in a same sub-region of in the sub-regions R1, R2, R3, R4, R5 and R6 may be substantially the same as each other.

In an exemplary embodiment, the fine branches 199 of upper sub-regions R1 and R5 among the sub-regions R1, R2, R5 and R6 defined by the horizontal stems 195a and 195c and the vertical stems 197a and 197c of the upper and lower unit electrodes DWa and DWc may obliquely extend in an upper right direction from the horizontal stems 195a and 195c, or the vertical stems 197a and 197c, and the fine branches 199 of lower sub-regions R2 and R4 among the sub-regions R1, R2, R5 and R6 defined by the horizontal stems 195a and 195c and the vertical stems 197a and 197c of the upper and lower unit electrodes DWa and DWc may obliquely extend in a lower right direction from the horizontal stems 195a and 195c or the vertical stems 197a and 197c. In an exemplary embodiment, the fine branches 199 of an upper sub-region R3 among the sub-regions R3 and R4 defined by the horizontal stem 195b and the vertical stem 197b of the intermediate unit electrode DWb may obliquely extend in an upper left direction from the horizontal stem 195b or the vertical stem 197b, and the fine branches 199 of a lower sub-region R4 among the sub-regions R3 and R4 defined by the horizontal stem 195b and the vertical stem 197b of the intermediate unit electrode DWb may obliquely extend in a lower left direction from the horizontal stem 195b or the vertical stem 197b.

An acute angle formed by the fine branches 199 and the horizontal stems 195a, 195b and 195c may be about 40° to about 45°, but is not limited thereto, and may be variously modified based on the display characteristics, such as the visibility of the liquid crystal display.

Other features of each of the horizontal stems 195a, 195b and 195c and each of the vertical stems 197a, 197b, and 197c may be substantially the same as the horizontal and the vertical stems of the first sub-pixel electrode 191a.

Referring to FIGS. 4 to 7, in an exemplary embodiment, the liquid crystal layer 3 in a pixel may implement a wide viewing angle, including a plurality of domains, in which the inclined directions of the liquid crystal molecules 31 are different from each other when an electric field is generated in the liquid crystal layer 3. The inclined directions of the liquid crystal molecule 31 in a same domain may be substantially the same as each other, or the liquid crystal molecule 31 in each domain may have a predetermined direction. Herein, the predetermined direction may be referred to as a behavior direction of the liquid crystal molecule 31 or a domain direction.

The domains of the liquid crystal layer 3 in a pixel PX may correspond to the sub-regions R1 to R4 of the first sub-pixel electrode 191a and the sub-regions R1 to R6 of the second sub-pixel electrode 191b. In one exemplary embodiment, for example, when ten sub-regions of the lower electrode, that is, the four sub-regions R1 to R4 of the first sub-pixel electrode 191a and the six sub-regions R1 to R6 of the second sub-pixel electrode 191b are provided, the liquid crystal layer 3 corresponding thereto may have ten domains in each pixel PX.

The liquid crystal molecules 31 of each domain may have a pretilt angle corresponding to a pretilt direction or a behavior direction, and may be initially aligned in the state in which no electric field is generated in the liquid crystal layer 3, thereby having a rapid response speed. In an exemplary embodiment, in which the liquid crystal molecule 31 has the pretilt angle, the alignment layer having a plurality of alignment directions is may be included, and the liquid crystal layer 3 or the alignment layer may also include a hardened alignment aid to provide the pretilt angle of the liquid crystal molecule 31. In an exemplary embodiment, where the alignment layer provides the pretilt angle of the liquid crystal molecule 31, the initial alignment direction, the alignment angle and the like of the liquid crystal molecule 31 may be provided by obliquely irradiating light, such as ultraviolet rays, to the alignment layer.

Next, an operation of an exemplary embodiment of the liquid crystal display, according to the invention, will be described with reference to FIGS. 3 to 7.

When the switching elements Qa and Qb are turned on by a gate-on voltage applied to the gate electrodes of the switching elements Qa and Qb, the data voltage is applied to the first and second sub-pixel electrodes 191a and 191b through the turned-on switching elements Qa and Qb. Both of the first and second sub-pixel electrodes 191a and 191b applied with the data voltage and the upper electrode 270 applied with the common voltage generate an electric field in the liquid crystal layer 3.

The electric field includes a horizontal component in a direction substantially parallel to the surfaces of the panels 100 and 200, and the liquid crystal molecule 31 is inclined in a direction substantially parallel to the surfaces of the panels 100 and 200 due to the horizontal component of the electric field. In such an embodiment, a fringe field is generated between the edges of the horizontal stems 195a and 195b; 195a, 195b, and 195c, the vertical stems 197a and 197b; 197a, 197b and 197c, the fine branches 199, and the like, of the first and second sub-pixel electrodes 191a and 191b and the upper electrode 270, such that the liquid crystal molecules 31 are inclined toward connected portions between the horizontal stems 195a and 195b; 195a, 195b and 195c and the vertical stems 197a and 197b; 197a, 197b and 197c and in a direction substantially parallel to the fine branches 199. Therefore, the liquid crystal layer 3 of a pixel PX includes the plurality of domains in which the inclined directions of the liquid crystal molecules 31 are different from each other.

In one exemplary embodiment, for example, in the first sub-pixel PXa as shown in FIG. 6, the liquid crystal molecule 31 in the sub-region R1 is inclined substantially in a first direction dr1, the liquid crystal molecule 31 in the sub-region R2 is inclined substantially in a second direction dr2, the liquid crystal molecule 31 in the sub-region R3 is inclined substantially in a third direction dr3, and the liquid crystal molecule 31 in the sub-region R4 is inclined substantially in a fourth direction dr4. The first to fourth directions dr1 to dr4 are the behavior directions of each of the liquid crystal molecules 31. In one exemplary embodiment, for example, the domains, in which the liquid crystal molecule is inclined in the first and second directions dr1 and dr2, are visualized substantially in the left viewing angle, and the domains in which the liquid crystal molecule is inclined in the third and fourth directions dr3 and dr4, are visualized substantially in the right viewing angle. In an exemplary embodiment, all of the domains are visualized at the front, independent of the domain direction. The left and right viewing angles, which visualize a pair of domains in the first and second directions and a pair of domains in the third and fourth directions, are different from each other, such that the directions dr1 and dr2 of the pair of first and second domains and the directions dr3 and dr4 of the pair of third and fourth domains may be alternately represented.

In an exemplary embodiment, in the second sub-pixel PXb as shown in FIG. 7, the liquid crystal molecules 31 in the sub-regions R1 to R6 are inclined substantially in the first to sixth directions dr1 to dr6, respectively, which are the behavior directions of each of the liquid crystal molecules 31. In one exemplary embodiment, for example, the domains, in which the liquid crystal molecule is inclined in the first, second, fifth and sixth directions dr1, dr2, dr5 and dr6, are visualized substantially in the left viewing angle, and the domains, in which the liquid crystal molecule is inclined in the third and fourth directions dr3 and dr4, are visualized substantially in the right viewing angle. When the sizes of the domains in the third and fourth directions are substantially equal to the sizes of the first, second, fifth and sixth directions, even though the number of domains for the left viewing angle is different from the number of domains for the right viewing angle, the left and right viewing angles may be symmetrical to each other.

In an exemplary embodiment, the first direction dr1 of the first sub-pixel PXa may be substantially the same as the first and fifth directions dr1 and dr5 of the second sub-pixel PXb, the second direction dr2 of the first sub-pixel PXa may be substantially the same as the second and sixth directions dr2 and dr6 of the second sub-pixel PXb, and the third and fourth directions dr3 and dr4 of the first sub-pixel PXa may each be substantially the same as the third and fourth directions dr3 and dr4 of the second sub-pixel PXb.

Figure 8:
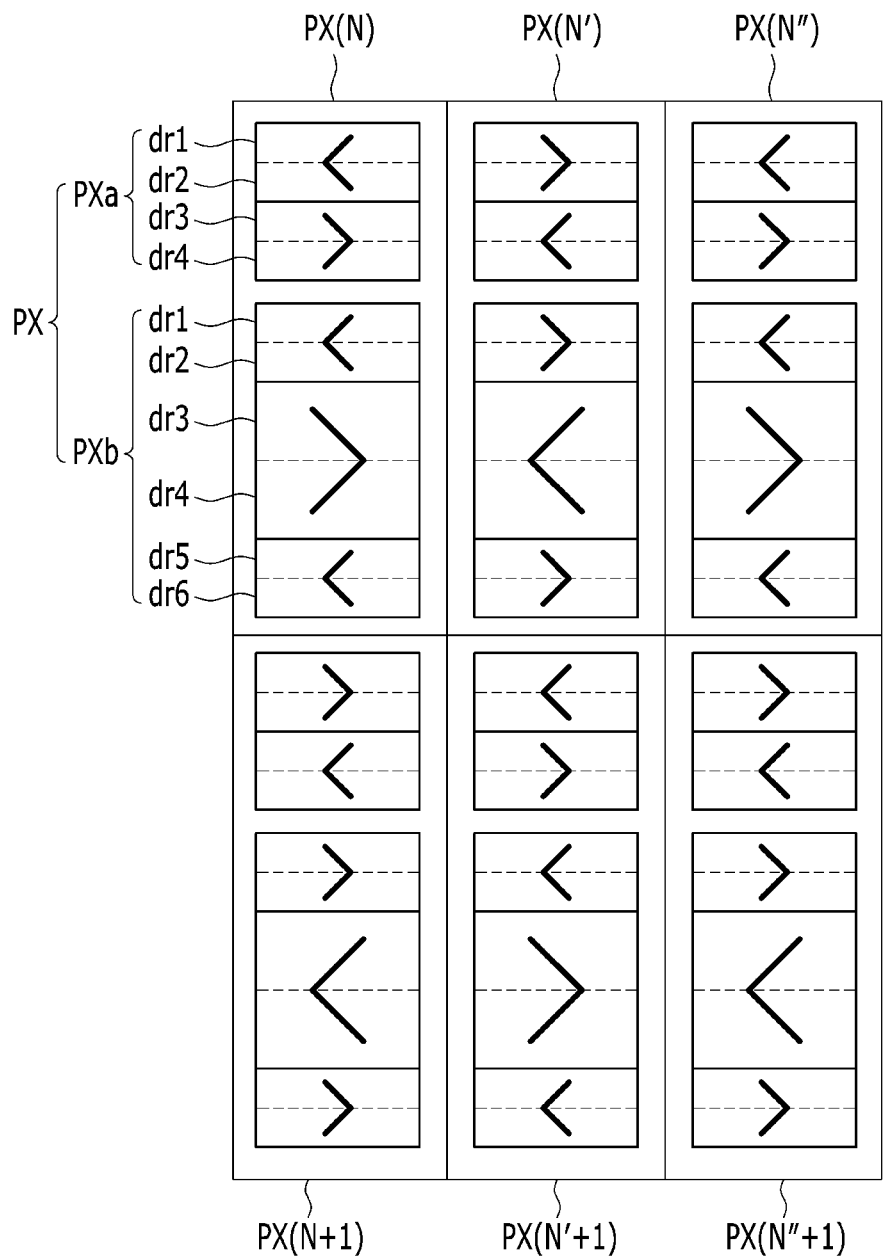
FIG. 8 is a diagram illustrating directions of domain dividers in adjacent pixels of an exemplary embodiment of the liquid crystal display according to the exemplary embodiment of the invention.

FIG. 8 is a diagram illustrating directions of domain dividers in adjacent pixels of an exemplary embodiment of the liquid crystal display, according to the invention.

In FIG. 8, six adjacent pixels of an exemplary embodiment of the liquid crystal display, where each pixel PX includes the first sub-pixel PXa divided into four domains and the second sub-pixel PXb divided into six domains, are illustrated.

In an exemplary embodiment, each pixel may have directions of the domain dividers that allow domain directions between upper and lower and left and right adjacent pixels are opposite to each other such that a horizontal line is effectively prevented from being visualized in the side viewing angle of the liquid crystal display. In one exemplary embodiment, for example, when an N-th pixel PX(N) in a column direction has the domain directions dr1 to dr4 and dr1 to dr6 described with reference to FIGS. 6 and 7, a first right pixel PX(N') of the N-th pixel PX(N) has a domain direction in which the directions of each domain are symmetric to each other with respect to a boundary thereof with the N-th pixel PX(N). Although not illustrated, the domain direction of the left pixel of the N-th pixel PX(N) is symmetric to the N-th pixel PX(X) with respect to a boundary thereof with the PX(N). A second right pixel PX(N") of the N-th pixel PX(N), which is a right pixel of the first right pixel PX(N') of the N-th pixel PX(N), has a domain direction symmetric to the domain direction of the right pixel PX(N') of the N-th pixel PX(N) with respect to the boundary thereof with the right pixel PX(N') of the N-th pixel PX(N), and therefore has the same domain direction as the N-th pixel PX(N). An (N+1)-th pixel PX(N+1) and a second right pixel PX(N"+1) of the (N+1)-th pixel PX(N+1), which are an (N+1)-th pixel in the column direction, have the domain directions which is opposite to the domain directions of the N-th pixel PX(N) and the second right pixel PX(N") of the N-th pixel PX(N), but have the domain direction the same as the right pixel PX(N') of the N-th pixel PX(N). A first right pixel PX(N'+1) of the (N+1)-th pixel PX(N+1) has the domain direction opposite to the first right pixel PX(N') of the N-th pixel PX(N), but has the same domain direction as the N-th pixel PX(N) and the second right pixel PX(N") of the N-th pixel PX(N).

In a pixel, for example, in the N-th pixel PX(N), the directions dr1 and dr2 of the pair of first and second domains are opposite to the directions dr3 and dr4 of the pair of third and fourth domains of the first sub-pixel. In such an embodiment, the directions dr3 and dr4 of the pair of third and fourth domains of the first sub-pixel are opposite to each other, the directions dr1 and dr2 of the pair of first and second domains of the second sub-pixel are opposite to each other, the directions dr3 and dr4 of the pair of third and fourth domains are opposite to each other, and the directions dr5 and dr6 of the pair of fifth and sixth domains are opposite to each other. In such an embodiment, the opposition or crossing of the domain directions is repeated between the pixels adjacent to each other in the left and right directions. In one exemplary embodiment, for example, as shown in FIG. 8, the pair of domains represented by "<" may be a domain visualized substantially at the left viewing angle, and the pair of domains represented by ">" may be a domain visualized substantially at the right viewing angle.

In the upper and lower pixels, the directions dr5 and dr6 of the pair of fifth and sixth domains of the second sub-pixel of the N-th pixel PX(N) and the directions dr1 and dr2 of the pair of first and second domains of the first sub-pixel of the (N+1)-th pixel PX(N+1) are opposite to each other. Similarly, the direction of the pair of fifth and sixth domains of the second sub-pixel of the upper pixel and the direction of the pair of first and second domains of the first sub-pixel of the lower pixel are opposite to each other at the boundaries between the first right pixel PX(N') of the N-th pixel PX(N) and the first right pixel PX(N'+1) of the (N+1)-th pixel PX(N+1) and between the second right pixel PX(N") of the N-th pixel PX(N) and the first right pixel PX(N"+1) of the (N+1)-th pixel PX(N+1). Therefore, in such an embodiment, all the directions of the pair of adjacent domains are opposite to each other even at the boundaries of the upper and lower pixels. Accordingly, in an exemplary embodiment of the invention, a dark part in a shape of a dot, which may be seen when the directions of the pair of domains are the same around the boundary between the upper and lower pixels, may be effectively prevented at the side viewing angle.

Figure 9:
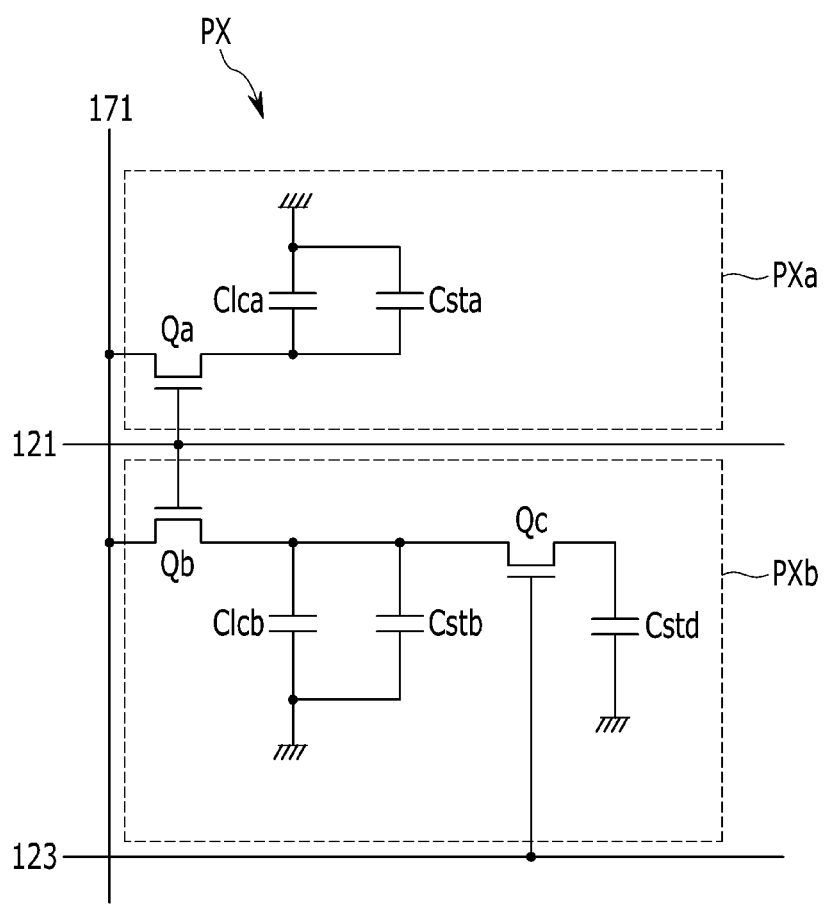
FIG. 9 is an equivalent circuit diagram of a pixel of an alternative exemplary embodiment of the liquid crystal display, according to the invention.
Figure 10:
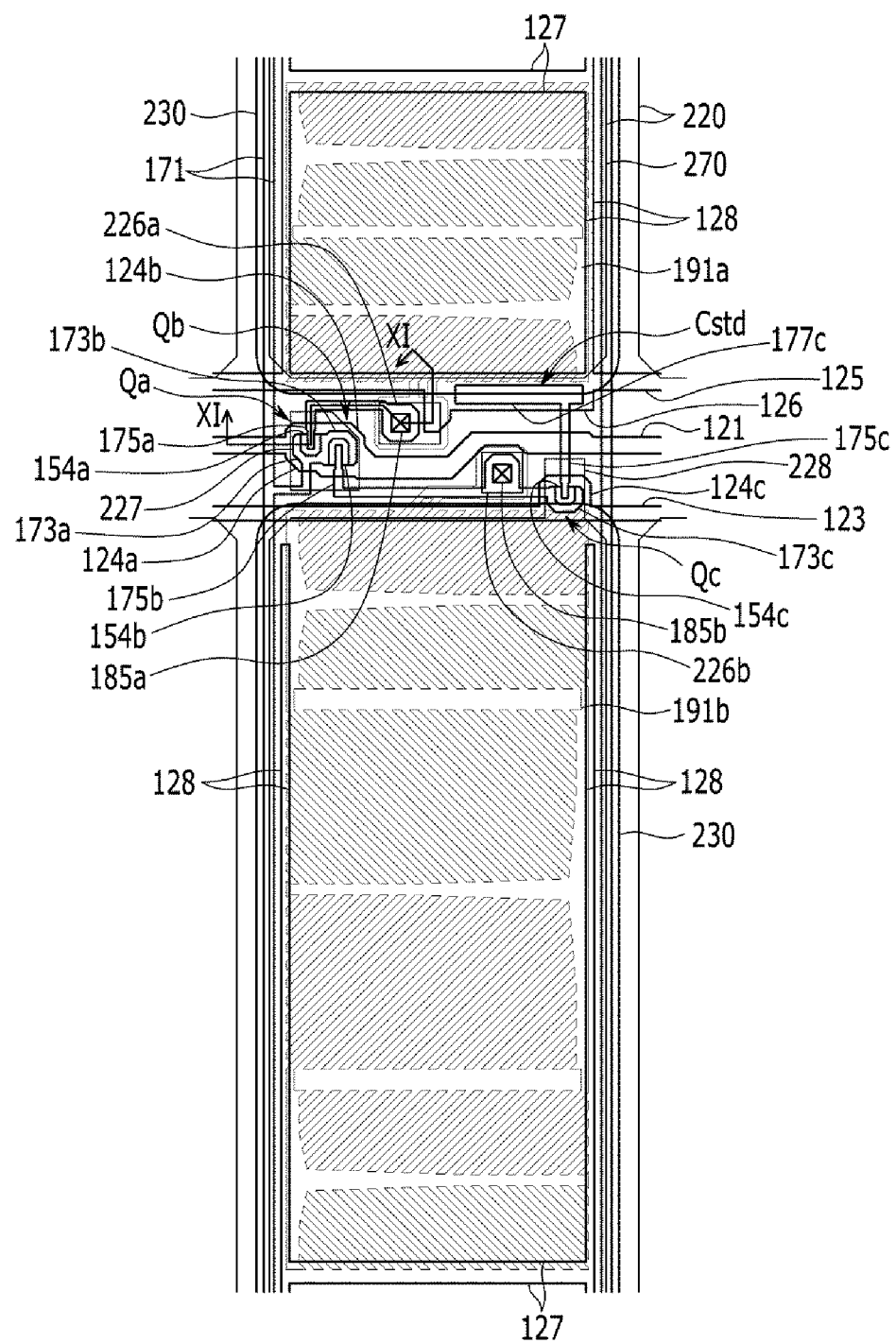
FIG. 10 is a layout view of a pixel of an alternative exemplary embodiment of the liquid crystal display, according to the invention.
Figure 11:
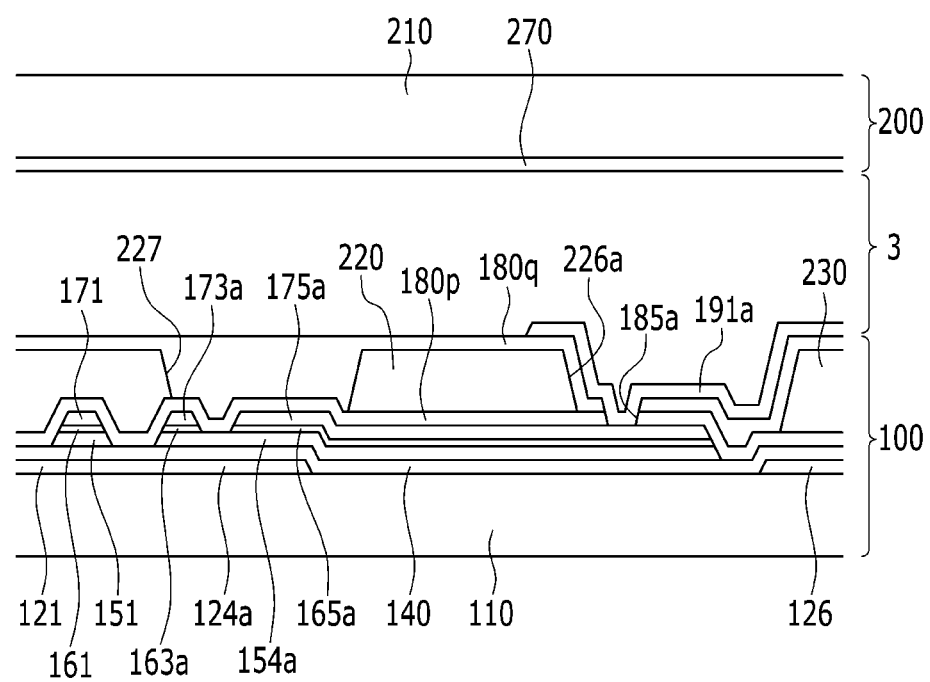
FIG. 11 is a cross-sectional view taken along line XI-XI of the liquid crystal display of FIG. 10.

FIG. 9 is an equivalent circuit diagram of a pixel of an alternative exemplary embodiment of the liquid crystal display, according to the invention, FIG. 10 is a top plan view of a pixel of an alternative exemplary embodiment of the liquid crystal display, according to the invention, and FIG. 11 is a cross-sectional view taken along line XI-XI of the liquid crystal display of FIG. 10.

Referring to FIG. 9, an alternative exemplary embodiment of the liquid crystal display includes signal lines including a gate line 121, a pressure reduction gate line 123 and a data line 171, and the pixel PX connected to the signal lines.

The first sub-pixel PXa of each pixel PX includes the first switching element Qa, the first liquid crystal capacitor Clca and the first storage capacitor Csta, and the second sub-pixel PXb includes the second switching element Qb, a third switching element Qc, the second liquid crystal capacitor Clcb, the second storage capacitor Cstb and a pressure reduction capacitor Cstd. The first and second switching elements Qa and Qb are connected to the gate line 121 and the data line 171, and the third switching element Qc is connected to the pressure reduction gate line 123. The control terminals of the first and second switching elements Qa and Qb are connected to the gate line 121, the input terminals of the first and second switching elements Qa and Qb are connected to the data line 171, and the output terminals of the first and second switching elements Qa and Qb are each connected to the first and second liquid crystal capacitors Clca and Clcb, respectively, and the first and second storage capacitors Csta and Cstb, respectively. The control terminal of the third switching element Qc is connected to the pressure reduction gate line 123, the input terminal of the third switching element Qc is connected to the second liquid crystal capacitor Clcb, and the output terminal of the third switching element Qc is connected to the pressure reduction capacitor Cstd. The pressure reduction capacitor Cstd is connected to the output terminal of the third switching element Qc and is applied with the common voltage.

Hereinafter, the operation of the pixel PX will be described. In such an embodiment, when the gate line 121 is applied with the gate-on voltage, the first and second thin film transistors Qa and Qb connected thereto are turned on. Therefore, the data voltage of the data line 171 is applied to the first and second liquid crystal capacitors Clca and Clcb through the turned-on first and second switching elements Qa and Qb, such that the first and second liquid crystal capacitors Clca and Clcb are charged with a difference between the data voltage and the common voltage. In such an embodiment, the pressure reduction gate line 123 is applied with a gate-off voltage when the gate line 121 is applied with the gate-on voltage. Next, when the gate line 121 is applied with the gate-off voltage, the pressure reduction gate line 123 is applied with the gate-on voltage, such that the first and second switching elements Qa and Qb connected to the gate line 121 are turned off and the third switching element Qc is turned on. Therefore, the charging voltage of the second liquid crystal capacitor Clcb connected to the output terminal of the second switching element Qb is lowered. Therefore, in an exemplary embodiment of the liquid crystal display which is driven with a frame inversion, the charging voltage of the second liquid crystal capacitor Clcb may be constantly lower than the charging voltage of the first liquid crystal capacitor Clca. Therefore, the side visibility of the liquid crystal display may be improved by allowing charging voltages of the first and second liquid crystal capacitors Clca and Clcb to be different from each other.

FIGS. 10 and 11 illustrate an exemplary embodiment of the liquid crystal display having the circuit structure illustrated in FIG. 9, according to the invention.

In an exemplary embodiment, the liquid crystal display includes the lower panel 100 and the upper panel 200 facing each other and the liquid crystal layer 3 interposed between the lower and upper panels 100 and 200.

In the lower panel 100, a plurality of gate conductors including the gate line 121, the pressure reduction gate line 123 and the storage electrode line 125 is disposed on the lower insulating substrate 110. The gate line 121 and the pressure reduction gate line 123 extend substantially in a horizontal direction and transfer the gate signals. The gate line 121 may include a first gate electrode 124a and a second gate electrode 124b, and the pressure reduction gate line 123 may include a third gate electrode 124c. The first and second gate electrodes 124a and 124b are connected to each other. The storage electrode line 125 may extend substantially in the horizontal direction and transfer a predetermined voltage, such as the common voltage. The storage electrode line 125 may include a sustain extension 126, the pair of vertical parts 128 which extends upwardly from an extending direction of the storage electrode line 125 to be substantially vertical to the gate line 121, and the horizontal part 127 which connects the pair of vertical parts 128, but the structure of the storage electrode line 125 is not limited thereto.

The gate insulating layer 140 is disposed on the gate conductor, and a semiconductor stripe 151 is disposed thereon. The semiconductor stripe 151 may extend substantially in a vertical direction and extend toward the first and second gate electrodes 124a and 124b and includes the first and second semiconductors 154a and 154b, which are connected to each other, and the third semiconductor 154c, which is connected to the second semiconductor 154b.

An ohmic contact stripe 161 may be disposed on the semiconductor stripe 151. The ohmic contact stripe 161 may include ohmic contacts 163a and 165a disposed on the first semiconductor 154a, and ohmic contacts disposed on the second semiconductor 154b and the third semiconductor 154c. In an alternative exemplary embodiment, the ohmic contact stripe 161 including the ohmic contacts 163a and 165a may be omitted.

The data conductors including the data line 171, the first drain electrode 175a, and the second and third drain electrodes 175b and 175c are disposed on the ohmic contact stripe 161. The data line 171 may include the first and second source electrodes 173a and 173b which extend toward the first and second gate electrodes 124a and 124b. A bar-shaped end of the first and second drain electrodes 175a and 175b is partially enclosed with the first and second source electrodes 173a and 173b. A wide end of the second drain electrode 175b may further extend to form the third source electrode 173c, which is bent in a U-like shape. A wide end 177c of the third drain electrode 175c overlaps the sustain extension 126 to form the pressure reduction capacitor Cstd, and a bar-shaped end of the third drain electrode 175c is partially enclosed with the third source electrode 173c.

The first gate electrode 124a, the first source electrode 173a and the first drain electrode 175a collectively define the first thin film transistor Qa, along with the first semiconductor 154a. Similarly, the second gate electrode 124b, the second source electrode 173b and the second drain electrode 175b collectively define the second thin film transistor Qb, along with the second semiconductor 154b, and the third gate electrode 124c, the third source electrode 173c and the third drain electrode 175c collectively define the third thin film transistor Qc, along with the third semiconductor 154c.

A lower passivation layer 180p may be disposed on the data conductors 171, 175a, 175b and 175c and an exposed portion of the semiconductors 154a, 154b and 154c, and the color filter 230 and the light blocking member 220 may be disposed on the lower passivation layer 180p. An opening 227 which is positioned on the first and second thin film transistors Qa and Qb, an opening 226a, which is positioned on the wide end of the first drain electrode 175a, an opening 226b, which is positioned on the wide end of the second drain electrode 175b, and an opening 228 which is positioned on the third thin film transistor Qc, may be defined in the light blocking member 220. In an alternative exemplary embodiment, at least one of the color filter 230 and the light blocking member 220 may be disposed in the upper panel 200.

An upper passivation layer 180q is disposed on the color filter 230 and the light blocking member 220. A plurality of contact holes 185a and 185b, which exposes the first drain electrode 175a and the second drain electrode 175b, respectively, is define in the lower passivation layer 180p and the upper passivation layer 180q.

The first sub-pixel electrode 191a and the second sub-pixel electrode 191b of a pixel PX are disposed on the upper passivation layer 180q. The first sub-pixel electrode 191a and the second sub-pixel electrode 191b may has the same structure or substantially the same structure as the sub-pixel electrodes 191a and 191b described with reference to FIGS. 6 and 7, or a modified structure thereof. In an exemplary embodiment, the first sub-pixel electrode 191a may include two adjacent unit electrodes, and the second sub-pixel electrode 191b may include three adjacent unit electrodes, e.g., upper, intermediate and lower unit electrodes, in which the size of the intermediate unit electrode may be substantially the same as a sum of the sizes of the upper and lower unit electrodes. In such an embodiment, the first sub-pixel electrode 191a may be divided into, for example, four sub-pixel regions, and the second sub-pixel electrodes 191b may be divided into, for example, six sub-regions.

In such an embodiment, the connection part 192 between the unit electrodes may be disposed at the left and right edges of the first and second sub-pixel electrodes 191a and 191b.

The first sub-pixel electrode 191a may be applied with the data voltage from the first drain electrode 175a through the contact hole 185a, and the second sub-pixel electrode 191b may be applied with the data voltage from the second drain electrode 175b through the contact hole 185b.

The upper panel 200 and the liquid crystal layer 3 are substantially the same as the exemplary embodiment of the invention shown in FIG. 1, and any repetitive detailed description thereof will be omitted.

Figure 12:
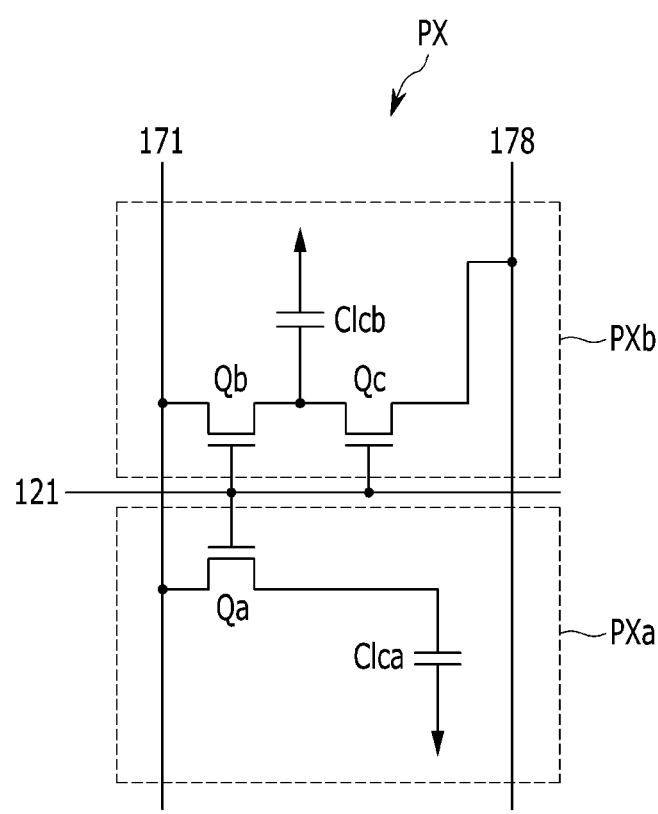
FIGS. 12 to 14 are equivalent circuit diagrams of a pixel of other alternative exemplary embodiments of the liquid crystal display, according to the invention.
Figure 13:
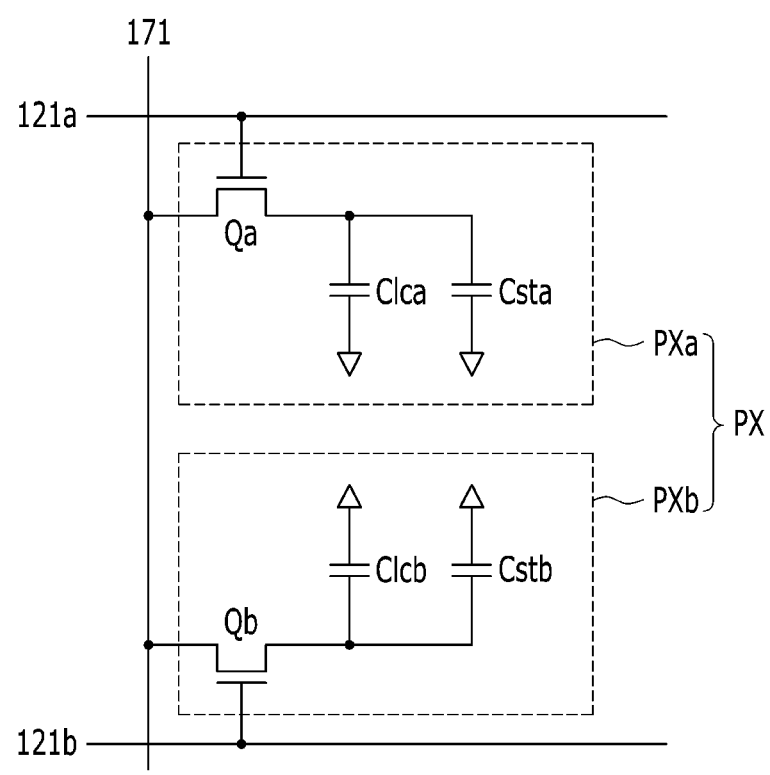
Figure 14:
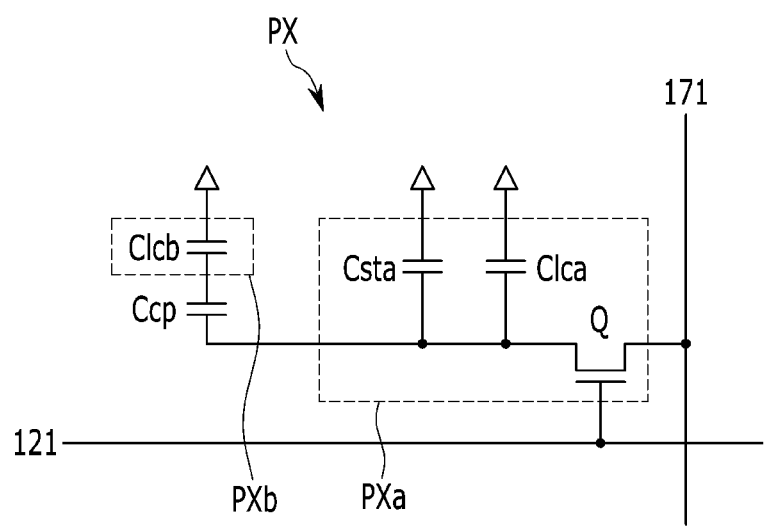

In such an embodiment, the first sub-pixel electrode 191a and the upper electrode 270 forms the first liquid crystal capacitor Clca, along with the liquid crystal layer 3 therebetween and the second sub-pixel electrode 191b and the upper electrode 270 forms the second liquid crystal capacitor Clcb, along with the liquid crystal layer 3 therebetween to hold the applied voltage even after the first and second thin film transistors Qa and Qb are turned off In such an embodiment, the first and second sub-pixel electrodes 191a and 191b overlap the storage electrode line 125 to form the first and second storage capacitors Csta and Cstb FIGS. 12 to 14 are equivalent circuit diagrams of a pixel of other alternative exemplary embodiments of the liquid crystal display, according to the invention. The circuit structures of the pixel PX including the first sub-pixel PXa and the second sub-pixel PXb of exemplary embodiments of the liquid crystal display is not limited thereto, and may be variously modified.

Referring first to FIG. 12, an alternative exemplary embodiment of the liquid crystal display includes the signal lines, which include a gate line 121, a data line 171, a reference voltage line 178 that transfers a reference voltage and the like, and the pixel PX connected to the signal lines.

Each pixel PX includes the first and second sub-pixels PXa and PXb. The first sub-pixel PXa includes the first switching element Qa and the first liquid crystal capacitor Clca, and the second sub-pixel PXb includes the second and third switching elements Qb and Qc, and the second liquid crystal capacitors Clca and Clcb. The first and second switching elements Qa and Qb each are connected to the gate line 121 and the data line 171, and the third switching element Qc is connected to the output terminal of the second switching element Qb and the reference voltage line 178. The output terminal of the first switching element Qa is connected to the first liquid crystal capacitor Clca, and the output terminal of the second switching element Qb is connected to the second input liquid crystal capacitor Clcb and the input terminal of the third switching element Qc. The control terminal of the third switching element Qc is connected to the gate line 121, the input terminal of the third switching element Qc is connected to the second liquid crystal capacitor Clcb, and the output terminal of the third switching element Qc is connected to the reference voltage line 178.

Hereinafter, the operation of the pixel PX illustrated in FIG. 12 will be described. In an exemplary embodiment, when the gate-on voltage is applied to the gate line 121, the first switching element Qa, the second switching element Qb and the third switching element Qc, which are connected to the gate line 121, are turned on. Therefore, the data voltage applied to the data line 171 is applied to the first liquid crystal capacitor Clca and the second liquid crystal capacitor Clcb, respectively, through the first switching element Qa and the second switching element Qb, which are turned on, such that the first liquid crystal capacitor Clca and the second liquid crystal capacitor Clcb are charged by a voltage corresponding to a difference between the data voltage and the common voltage. In such an embodiment, the same data voltage is transferred to the first liquid crystal capacitor Clca and the second liquid crystal capacitor Clcb through the first and second switching elements Qa and Qb, but the charging voltage of the second liquid crystal capacitor Clcb is divided through the third switching element Qc. Therefore, the charging voltage of the second liquid crystal capacitor Clcb is less than the charging voltage of the first liquid crystal capacitor Clca, such that the luminance of the two sub-pixels PXa and PXb may be different from each other. Therefore, when the voltage charged in the first liquid crystal capacitor Clca and the voltage charged in the second liquid crystal capacitor Clcb are appropriately controlled, the image viewed from a side may become substantially close to the image viewed from a front, thereby improving the side visibility.

Referring next to FIG. 13, another alternative exemplary embodiment of the liquid crystal display includes the signal lines, which include a data line 171, and first and second gate lines 121a and 121b, and the pixel PX connected to the signal lines.

The first switching element Qa in the first sub-pixels PXa of each pixel PX includes the control terminal connected to the first gate line 121a and the input terminal connected to the data line 171. The output terminal of the first switching element Qa is connected to the first liquid crystal capacitor Clca and the first storage capacitor Csta. The second switching element Qb of the second sub-pixel PXb includes the control terminal connected to the second gate line 121b and the input terminal connected to the data line 171. The output terminal of the second switching element Qb is connected to a second liquid crystal capacitor Clcb and a second storage capacitor Cstb. The first liquid crystal capacitor Clca and the second liquid crystal capacitor Clcb may be each applied with different data voltage corresponding to a same input image signal transferred along the data line 171 at different times through the first and second switching elements Qa and Qb, which are connected to the different gate lines 121a and 121b, respectively.

Referring next to FIG. 14, another alternative exemplary embodiment of the liquid crystal display includes the signal lines, which include a data line 171 and the gate line 121, and a pixel PX connected to the signal lines.

Each pixel PX may include the first and second sub-pixels PXa and PXb, and a coupling capacitor Ccp, which is connected between the first and second sub-pixels PXa and PXb. The first sub-pixel PXa includes the switching element Q, which is connected to the gate line 121 and the data line 171, and the first liquid crystal capacitor Clca and the first storage capacitor Csta, which are connected to the switching element Q, and the second sub-pixel PXb includes the coupling capacitor Ccp and the second liquid crystal capacitor Clcb connected to the coupling capacitor Ccp. The control terminal of the switching element Q is connected to the gate line 121, the input terminal of the switching element Q is connected to the data line 171, and the output terminal of the switching element Q is connected to the first liquid crystal capacitor Clca, the first storage capacitor Csta and the coupling capacitor Ccp. The switching element Q transfers the data voltage of the data line 171 to the first liquid crystal capacitor Clca and the coupling capacitor Ccp based on the gate signal from the gate line 121, and the coupling capacitor Ccp changes the magnitude of the voltage and then may transfer the changed voltage to the second liquid crystal capacitor Clcb. The voltage charged in the second liquid crystal capacitor Clcb by the coupling capacitor Ccp may be constantly less than the voltage charged in the first liquid crystal capacitor Clca. Therefore, when capacitance of the coupling capacitor Ccp is appropriately controlled, the side visibility may be improved by controlling the ratio of the charging voltage of the first liquid crystal capacitor Clca and the charging voltage of the second liquid crystal capacitor Clcb.

In such embodiments of the liquid crystal display, according to the invention, the first sub-pixel electrode and the second sub-pixel electrode that define one terminals of the first and second liquid crystal capacitors Clca and Clcb, respectively, which are included in the pixel PX may each have substantially the same structure as the sub-pixel electrodes 191a and 191b of the exemplary embodiments of the invention described above and may thus have the same effect and function.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
a thin film transistor array panel;
a counter panel opposite to the thin film transistor array panel;
a liquid crystal layer between the thin film transistor array panel and the counter panel; and
a plurality of pixel electrodes disposed in the thin film transistor array panel, wherein each of the pixel electrodes comprises a first sub-pixel electrode and a second sub-pixel electrode,
wherein
each of the first and second sub-pixel electrodes is divided into a plurality of sub-regions by a plurality of domain dividers,
the domain dividers control tilt directions of liquid crystal molecules of the liquid crystal layer in the sub-regions, respectively,
vertically adjacent pixel electrodes comprises an upper pixel electrode and a lower pixel electrode, and
the tilt directions of the liquid crystal molecules in two bottom sub-regions of the second sub-pixel electrode of the upper pixel electrode and the tilt directions of the liquid crystal molecules in two top sub-regions of the first sub-pixel electrode of the lower pixel electrode are opposite to each other.

2. The liquid crystal display of claim 1, wherein
the first sub-pixel electrode is sequentially divided into first to fourth sub-regions from top to bottom, and
the second sub-pixel electrode is sequentially divided into first to sixth sub-regions from top to bottom.

3. The liquid crystal display of claim 2, wherein
a sum of sizes of first, second, fifth and sixth sub-regions of the second sub-pixel electrode is substantially the same as a sum of sizes of third and fourth sub-regions of the second sub-pixel electrode.

4. The liquid crystal display of claim 3, wherein
the tilt directions of the liquid crystal molecules in the first and second sub-regions of the first sub-pixel electrode, the tilt directions of the liquid crystal molecules in the first and second sub-regions of the second sub-pixel electrode, and the tilt directions of the liquid crystal molecules in the fifth and sixth sub-regions of the second sub-pixel electrode are substantially the same as each other, and the tilt directions of the liquid crystal molecules in the third and fourth sub-regions of the first sub-pixel electrode and the tilt directions of the liquid crystal molecules in the third and fourth sub-regions of the second sub-pixel electrode are substantially the same as each other.

5. The liquid crystal display of claim 4, wherein
the tilt directions of the liquid crystal molecules in the first and second sub-regions of the first sub-pixel electrode and the tilt directions of the liquid crystal molecules in the third and fourth sub-regions of the first sub-pixel electrode are opposite to each other.

6. The liquid crystal display of claim 1, wherein
the tilt directions of the liquid crystal molecules in two sub-regions of the first sub-pixel electrode of a pixel electrode and the tilt directions of the liquid crystal molecules in two bottom sub-regions of the second sub-pixel electrode of the pixel electrode are substantially the same as each other.

7. The liquid crystal display of claim 1, wherein
horizontally adjacent pixel electrodes of the pixel electrodes comprises a left pixel electrode and a right pixel electrode, and
a tilt direction of the liquid crystal molecules in each sub-region of the left pixel electrode and a tilt direction of the liquid crystal molecules in each corresponding sub-region of the right pixel electrode are substantially symmetric to each other with respect to a boundary between the left and right pixel electrodes.

8. The liquid crystal display of claim 7, wherein
the upper pixel electrode is the left pixel electrode, and
a tilt direction of the liquid crystal molecules in each sub-region of the lower pixel electrode is substantially the same as a tilt direction of the liquid crystal molecules in each corresponding sub-region of the right pixel electrode.

9. The liquid crystal display of claim 1, wherein
each of the first sub-pixel electrode and the second sub-pixel electrode comprises a plurality of unit electrodes which are connected to each other,
and each of the unit electrodes defines two adjacent sub-regions.

10. The liquid crystal display of claim 9, wherein
the first sub-pixel electrode comprises an upper unit electrode and a lower unit electrode, and
the second sub-pixel electrode comprises an upper unit electrode, an intermediate unit electrode and a lower unit electrode.

11. The liquid crystal display of claim 10, wherein
a size of the intermediate unit electrode of the second sub-pixel electrode is substantially the same as a sum of a size of the upper unit electrode of the second sub-pixel electrode and a size of the lower unit electrode of the second sub-pixel electrode.

12. The liquid crystal display of claim 9, wherein
each of the unit electrodes comprises a horizontal stem and a vertical stem, and
the horizontal stem defines a boundary between the two adjacent sub-regions.

13. The liquid crystal display of claim 12, wherein
each of the unit electrodes further comprises a plurality of fine branches which obliquely extends from the horizontal stem or the vertical stem, and
the fine branches are disposed in the two adjacent sub-regions.

14. The liquid crystal display of claim 13, wherein
the fine branches in the two adjacent sub-regions extends substantially symmetrically with respect to the horizontal stem, and
the fine branches in adjacent sub-regions between adjacent unit electrodes extend substantially in opposing directions to each other.

\* \* \* \* \*